(No Model.)

A. TARRIS.
SWINGING GATE.

No. 474,489. Patented May 10, 1892.

Witnesses.
A. Ruppert.
H. A. Daniels.

Inventor:
Andrew Tarris
Per
Thomas P. Simpson
Atty

UNITED STATES PATENT OFFICE.

ANDREW TARRIS, OF MARION, INDIANA, ASSIGNOR TO NEWTON C. RICHARDSON AND LAVINA J. TARRIS.

SWINGING GATE.

SPECIFICATION forming part of Letters Patent No. 474,489, dated May 10, 1892.

Application filed August 14, 1891. Serial No. 402,676. (No model.)

*To all whom it may concern:*

Be it known that I, ANDREW TARRIS, a citizen of the United States, residing at Marion, in the county of Grant and State of Indiana, have invented certain new and useful Improvements in Swinging Gates; and I do hereby declare the following to be a full, clear, and exact description of the invention, such as will enable others skilled in the art to which it appertains to make and use the same.

The special object of the invention is to hang a swinging gate in such a manner that it may be readily raised and held above a fall of snow, or so as to allow hogs to pass under without allowing the same privilege to horses or cattle.

Figure 1:
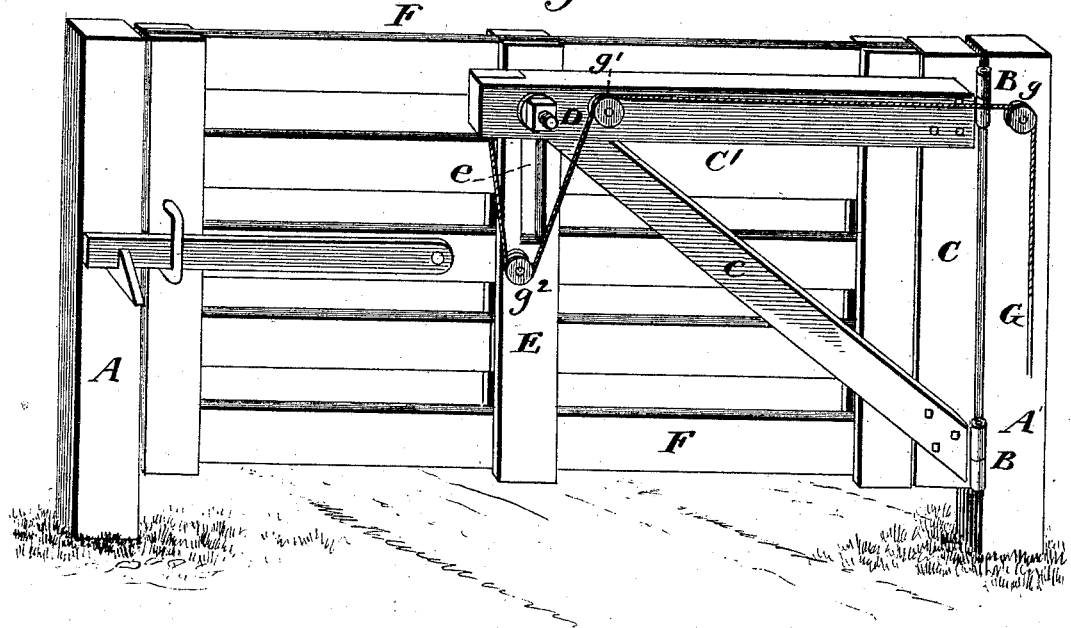
Figure 2:
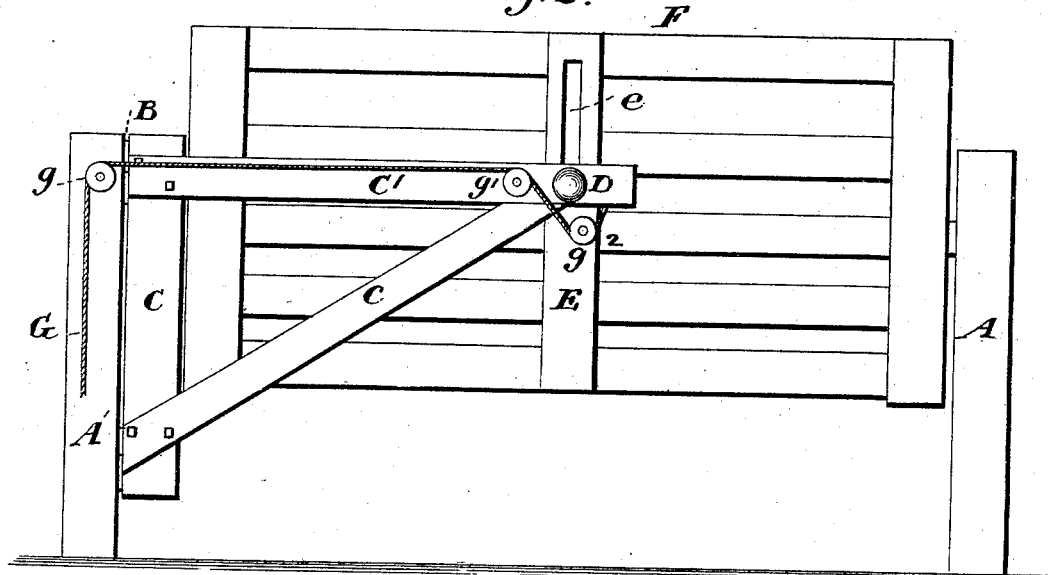

Figure 1 of the drawings is a perspective view; Fig. 2, a side elevation showing the gate elevated.

In the drawings, A A' represent two ground-posts, to one of which is suspended by the hinges B B a swinging post C, which carries the parallel arms C' C', supported by the diagonal braces $c\,c$ and connected at their ends by the cross-bolt D, which passes through the vertical slot $e$ in the middle stile E of the gate F and receives a nut at its threaded end, so that the gate may be clamped and securely held at any altitude which may be preferred. The gate is thus supported only by the clamp-bolt at the middle and in the swinging frame C $c$ C', which swings it out and in, and on which it is thus made vertically adjustable for the purposes before mentioned.

G is a wire rope secured at one end to the outer end of the arm C', passing down and around a pulley $g^2$ on the middle stile E, thence up and over a pulley $g'$ on the post-arm C, and finally over the pulley $g$ on the post A'. By this hand mechanism the gate may be conveniently raised and held up in the position desired.

What I claim as new, and desire to protect by Letters Patent, is—

A gate E, having the vertical slot $e$ and pulley $g^2$ at its middle, in combination with the swinging frame C $c$ C', having the horizontal cross-bolt D at its front end and provided with the pulley $g'$ on its bar C', the rope G, fastened at one end under the front of said bar C', and the post A', having a pulley $g$ near its upper end, said parts being constructed and arranged substantially as shown and described.

In testimony whereof I hereunto affix my signature in presence of two witnesses.

ANDREW TARRIS.

Witnesses:
 GEO. W. SMITH,
 CHARLEY MYERS.